United States Patent
Ren et al.

(10) Patent No.: US 11,570,106 B2
(45) Date of Patent: Jan. 31, 2023

(54) ADDRESS PROCESSING METHOD AND NETWORK DEVICE

(71) Applicant: HUAWEI TECHNOLOGIES CO., LTD., Shenzhen (CN)

(72) Inventors: Shoushou Ren, Beijing (CN); Delei Yu, Beijing (CN); Shihui Hu, Beijing (CN); Guangpeng Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 232 days.

(21) Appl. No.: 17/153,028

(22) Filed: Jan. 20, 2021

(65) Prior Publication Data

US 2021/0144093 A1    May 13, 2021

Related U.S. Application Data

(63) Continuation of application No. PCT/CN2019/097258, filed on Jul. 23, 2019.

(30) Foreign Application Priority Data

Jul. 23, 2018 (CN) .......................... 201810812492.2

(51) Int. Cl.
*H04L 12/745* (2013.01)
*H04L 29/12* (2006.01)
(Continued)

(52) U.S. Cl.
CPC ........ *H04L 45/748* (2013.01); *H04L 61/5007* (2022.05)

(58) Field of Classification Search
CPC ..... H04L 45/74; H04L 45/741; H04L 45/745; H04L 45/748; H04L 61/2007
See application file for complete search history.

(56) References Cited

U.S. PATENT DOCUMENTS 6,192,051 B1    2/2001 Lipman et al.
6,553,000 B1 *  4/2003 Ganesh ................... H04L 45/54
                                                  370/428
(Continued)

FOREIGN PATENT DOCUMENTS

CN    101183303 A    5/2008
CN    101827137 A    9/2010
(Continued)

OTHER PUBLICATIONS

Fuller et al: "Classless Inter-domain Routing (CIDR):The Internet Address Assignment and Aggregation Plan; rfc4632.txt",IETF, Aug. 1, 2006, XP015047393,total:28pages.
(Continued)

*Primary Examiner* — Alpus Hsu
(74) *Attorney, Agent, or Firm* — Rimon PC

(57) ABSTRACT

This application provides an address processing method and a network device. The method includes: obtaining, by a first network device, an address; determining, by the first network device, a length of a valid address of the address, where the valid address of the address is a $1^{st}$ bit, whose bit value is 1, of the address to a last bit of the address; and adding, by the first network device when the length of the valid address of the address is less than a table width of a target table, S zeros before the valid address of the address to obtain an adjusted address, and processing the adjusted address based on the adjusted address and the target table, where S is a difference between the table width of the target table and the length of the valid address of the address.

16 Claims, 5 Drawing Sheets

(51) Int. Cl.
*H04L 45/748* (2022.01)
*H04L 61/5007* (2022.01)

(56) References Cited

U.S. PATENT DOCUMENTS

| | | | | |
|---|---|---|---|---|
| 6,563,823 B1* | 5/2003 | Przygienda | ............. | H04L 45/54 370/428 |
| 6,768,739 B1* | 7/2004 | Kobayashi | ............. | H04L 45/00 370/395.31 |
| 7,310,685 B2* | 12/2007 | Basso | ................... | H04L 45/742 709/242 |
| 7,330,469 B2* | 2/2008 | Ko | ......................... | H04L 45/00 370/395.31 |
| 7,564,841 B2* | 7/2009 | Wybenga | ................ | H04L 45/48 370/392 |
| 7,630,367 B2 | 12/2009 | Singh | | |
| 7,630,373 B2* | 12/2009 | Okuno | ................... | H04L 45/60 370/392 |
| 7,788,406 B2* | 8/2010 | Basso | .................... | H04L 69/00 709/242 |
| 7,984,183 B2* | 7/2011 | Andersen | ........... | H04L 67/1029 709/244 |
| 7,986,696 B1* | 7/2011 | Miliavisky | ............. | H04L 45/54 711/108 |
| 8,717,793 B2* | 5/2014 | Maurya | ................ | G11C 15/046 365/49.17 |
| 9,596,181 B1* | 3/2017 | Goel | ................... | H04L 45/7453 |
| 9,906,443 B1* | 2/2018 | Singh | ..................... | H04L 45/02 |
| 9,979,648 B1* | 5/2018 | Singh | .................. | H04L 45/7453 |
| 9,985,885 B1* | 5/2018 | Singh | .................. | H04L 45/7453 |
| 10,135,734 B1* | 11/2018 | Singh | .................. | H04L 45/7453 |
| 2002/0138648 A1* | 9/2002 | Liu | ......................... | H04L 45/00 709/245 |
| 2005/0114337 A1* | 5/2005 | Lunteren | ................. | H04L 45/54 707/999.009 |
| 2008/0056262 A1 | 3/2008 | Singh | | |
| 2014/0237157 A1 | 8/2014 | Takefman et al. | | |
| 2015/0003458 A1 | 1/2015 | Li et al. | | |

FOREIGN PATENT DOCUMENTS

| | | |
|---|---|---|
| CN | 102487374 A | 6/2012 |
| CN | 103986656 A | 8/2014 |
| CN | 104021250 A | 9/2014 |
| CN | 104170333 A | 11/2014 |
| CN | 104866502 A | 8/2015 |
| CN | 107506310 A | 12/2017 |
| WO | 0051298 A1 | 8/2000 |

OTHER PUBLICATIONS

RFC: 791. Internet Protocol, DARPA Internet Program, Protocol Specification. Sep. 1, 1981, 49 pages.

Sun Yan-feng et al, A Technique for IP Routing Search Based on Multi-processor, Computer Knowledge and Technology(Academic Exchange), 2007, 3 pages.

\* cited by examiner

| Address | Subnet Mask | Next Hop |
|---|---|---|
| 0.16.1.0 | 24 | Router A |
| 0.16.2.0 | 24 | Router B |
| 0.16.0.0 | 16 | Discard |

FIG. 9

ADDRESS PROCESSING METHOD AND NETWORK DEVICE

CROSS-REFERENCE TO RELATED APPLICATIONS

This application is a continuation of International Application No. PCT/CN2019/097258, filed on Jul. 23, 2019, which claims priority to Chinese Patent Application No. 201810812492.2, filed on Jul. 23, 2018. The disclosures of the aforementioned applications are hereby incorporated by reference in their entireties.

TECHNICAL FIELD

This application relates to the field of information technologies, and more specifically, to an address processing method and a network device.

BACKGROUND

In some cases, a network device (for example, a network device A) in a network needs to send an address to another network device in the network. The other network device (for example, a network device B) may process the address based on a stored table. However, the table width of the table stored by the network device B must be equal to the length of the address sent by the network device A, so that the network device B can correctly process the address.

SUMMARY

This application provides an address processing method and a network device, to process an address whose length is not equal to a table width of a target table.

According to a first aspect, an embodiment of this application provides an address processing method. The method includes: obtaining, by a first network device, an address; determining, by the first network device, a length of a valid address of the address, where the valid address of the address is a $1^{st}$ bit, whose bit value is 1, of the address to a last bit of the address; and adding, by the first network device when the length of the valid address of the address is less than a table width of a target table, S zeros before the valid address of the address to obtain an adjusted address, and processing the adjusted address based on the adjusted address and the target table, where S is a difference between the table width of the target table and the length of the valid address of the address, the target table includes at least one entry, each of the at least one entry includes a destination address, and the table width of the target table is a total quantity of bits occupied by one destination address stored in the target table. Based on the foregoing technical solution, the length of the address obtained and processed by the first network device may not be equal to the table width of the target table. In other words, a length of an address transmitted in a network may be different from the table width of the table stored in the network device. In this way, a manner of transmitting an address by a network device in a network may be more flexible. In addition, the length of the transmitted address may be one or more bits less than the table width of the target table. This can reduce the length of the transmitted address. In this way, resources occupied by address transmission can be reduced, and data transmission efficiency in the network can be improved.

With reference to the first aspect, in a possible implementation, before the adding, by the first network device when the length of the valid address of the address is less than a table width of a target table, S zeros before the valid address of the address to obtain an adjusted address, the method further includes: determining, by the first network device, the target table, where the target table is a table with a smallest table width in tables whose table widths are greater than or equal to the length of the valid address of the address. According to the foregoing technical solution, the first network device may store a plurality of tables. The first network device may determine, based on the length of the valid address of the address, a target table corresponding to the address, and perform a subsequent operation based on the target table. In this way, the first network device can support an operation on addresses of different lengths. An IP address is used as an example. The first network device may store a table used to process an IPv4 address, and may also store a table used to process an IPv6 address. Alternatively, the first network device may store a table for processing IP addresses of different lengths in a variable-length IP address system.

With reference to the first aspect, in a possible implementation, the processing the adjusted address based on the adjusted address and the target table includes: determining a destination address, corresponding to the adjusted address, in the target table.

With reference to the first aspect, in a possible implementation, the processing the adjusted address based on the adjusted address and the target table includes: creating an entry in the target table, where a destination address in the entry is the adjusted address.

With reference to the first aspect, in a possible implementation, the obtaining, by a first network device, an address includes: receiving, by the first network device, address indication information sent by a second network device, where the address indication information is used to indicate values of a $1^{st}$ bit to an $N^{th}$ bit of the address and a first length M, and both N and M are positive integers greater than or equal to 1; and determining, by the first network device, the address based on the address indication information, where the values of the $1^{st}$ bit to the $N^{th}$ bit of the address are the values of the $1^{st}$ bit to the $N^{th}$ bit of the address that are indicated by the address indication information, and values of an $(N+1)^{th}$ bit to an $(N+M)^{th}$ bit of the address are preset values. Based on the foregoing technical solution, during address transmission, the second network device does not need to send a specific value of each bit of the address to the first network device. In this way, a quantity of transmitted bits can be reduced. Thanks to the reduced quantity of transmitted bits, the address can be transmitted faster, and a probability of transmission errors can be further reduced.

With reference to the first aspect, in a possible implementation, the address indication information is further used to indicate a second length N, and the determining, by the first network device, the address based on the address indication information includes: determining, by the first network device based on the second length N, that the N bits of the address indication information are respectively used to indicate the values of the $1^{st}$ bit to the $N^{th}$ bit of the address; determining, by the first network device, that the values of the $1^{st}$ bit to the $N^{th}$ bit of the address are respectively the values of the N bits; and determining, by the first network device, that the values of the $(N+1)^{th}$ bit to the $(N+M)^{th}$ bit of the address are the preset values.

With reference to the first aspect, in a possible implementation, the address indication information is further used to indicate a subnet mask.

With reference to the first aspect, in a possible implementation, the address indication information includes a prefix field and a length field, the prefix field includes the values of the $1^{st}$ bit to the $N^{th}$ bit of the address, and the length field is used to indicate the first length M and the second length N.

With reference to the first aspect, in a possible implementation, the length field includes a first subfield and a second subfield, the first subfield includes the first length M, and the second subfield includes the second length N; or the first subfield includes the first length M, and the second subfield includes a total length L of the address, where L is a sum of N and M; or the first subfield includes the second length N, and the second subfield includes a total length L of the address.

According to a second aspect, an embodiment of this application provides an address transmission method. The method includes: receiving, by a first network device, address indication information sent by a second network device, where the address indication information is used to indicate values of a $1^{st}$ bit to an $N^{th}$ bit of the address and a first length M, and both N and M are positive integers greater than or equal to 1; and determining, by the first network device, the address based on the address indication information, where the values of the $1^{st}$ bit to the $N^{th}$ bit of the address are the values of the $1^{st}$ bit to the $N^{th}$ bit of the address that are indicated by the address indication information, and values of an $(N+1)^{th}$ bit to an $(N+M)^{th}$ bit of the address are preset values. Based on the foregoing technical solution, during address transmission, the second network device does not need to send a specific value of each bit of the address to the first network device. In this way, a quantity of transmitted bits can be reduced. Thanks to the reduced number of transmitted bits the address can be transmitted faster, and a probability of transmission errors can be further reduced.

With reference to the second aspect, in a possible implementation, the address indication information is further used to indicate a second length N. The determining, by the first network device, the address based on the address indication information includes: determining, by the first network device based on the second length N, that the N bits of the address indication information are respectively used to indicate the values of the $1^{st}$ bit to the $N^{th}$ bit of the address; determining, by the first network device, that the values of the $1^{st}$ bit to the $N^{th}$ bit of the address are respectively the values of the N bits; and determining, by the first network device, that the values of the $(N+1)^{th}$ bit to the $(N+M)^{th}$ bit of the address are the preset values.

With reference to the second aspect, in a possible implementation, the address indication information includes a prefix field and a length field, the prefix field includes the values of the $1^{st}$ bit to the $N^{th}$ bit of the address, and the length field is used to indicate the first length M and the second length N.

With reference to the second aspect, in a possible implementation, the length field includes a first subfield and a second subfield, the first subfield includes the first length M, and the second subfield includes the second length N; or the first subfield includes the first length M, and the second subfield includes a total length L of the address, where L is a sum of N and M; or the first subfield includes the second length N, and the second subfield includes a total length L of the address.

With reference to the second aspect, in a possible implementation, the method further includes: determining, by the first network device, a length of a valid address of the address, where the valid address of the address is a $1^{st}$ bit, whose bit value is 1, of the address to a last bit of the address; and adding, by the first network device when the length of the valid address of the address is less than a table width of a target table, S zeros before the valid address of the address to obtain an adjusted address, and processing the adjusted address based on the adjusted address and the target table, where S is a difference between the table width of the target table and the length of the valid address of the address, the target table includes at least one entry, each of the at least one entry includes a destination address, and the table width of the target table is a total quantity of bits occupied by one destination address stored in the target table. Based on the foregoing technical solution, the length of the address obtained and processed by the first network device may not be equal to the table width of the target table. In other words, the length of the address transmitted in a network may be different from the table width of the table stored in the network device. In this case, a manner of transmitting an address by a network device in a network may be more flexible. In addition, the length of the transmitted address may be one or more invalid bits less than the table width of the target table. This can reduce the length of the transmitted address. In this way, resources occupied by address transmission can be reduced, and data transmission efficiency in the network can be improved.

With reference to the second aspect, in a possible implementation, before the adding, by the first network device when the length of the valid address of the address is less than a table width of a target table, S zeros before the valid address of the address to obtain an adjusted address, the method further includes: determining, by the first network device, the target table, where the target table is a table with a smallest table width in tables whose table widths are greater than or equal to the length of the valid address of the address. Based on the foregoing technical solution, the first network device may store a plurality of tables. The first network device may determine, based on the length of the valid address of the address, a target table corresponding to the address, and perform a subsequent operation based on the target table. In this way, the first network device can support an operation on addresses of different lengths. An IP address is used as an example. The first network device may store a table used to process an IPv4 address, and may also store a table used to process an IPv6 address. Alternatively, the first network device may store a table for processing IP addresses of different lengths in a variable-length IP address system.

With reference to the second aspect, in a possible implementation, the processing the adjusted address based on the adjusted address and the target table includes: determining a destination address, corresponding to the adjusted address, in the target table.

With reference to the second aspect, in a possible implementation, the processing the adjusted address based on the adjusted address and the target table includes: creating an entry in the target table, where a destination address in the entry is the adjusted address.

With reference to the second aspect, in a possible implementation, the address indication information is further used to indicate a subnet mask.

According to a third aspect, an embodiment of this application provides an address transmission method. The method includes: determining, by a second network device, a first part and a second part of an address, where the address includes the first part and the second part, the address length is L, the first part is a $1^{st}$ bit to an $N^{th}$ bit of the address, the second part is an $(N+1)^{th}$ bit to an $L^{th}$ bit of the address, and values of the bits forming the second part are all preset values; determining, by the second network device, address indication information, where the address indication information is used to indicate values of the $1^{st}$ bit to the $N^{th}$ bit of the address and a first length M, M is a difference between L and N, and both M and N are positive integers greater than or equal to 1; and sending, by the second network device, the IP address indication information to a first network device.

With reference to the third aspect, in a possible implementation, the $N^{th}$ bit of the address is a last bit, whose bit value is 1, of the address and the determining, by the second network device, a first part and a second part of the address includes: determining, by the second network device, that the first part is the $1^{st}$ bit of the address to the last bit, whose bit value is 1, of the IP address, and determining that the second part is bits of the IP address except the first part.

With reference to the third aspect, in a possible implementation, a subnet mask of the address is N, and the determining, by the second network device, a first part and a second part of the address includes: determining, by the second network device, that the first part is the $1^{st}$ bit to the $N^{th}$ bit of the address, and determining that the second part is the $(N+1)^{th}$ bit to the $L^{th}$ bit of the IP address.

With reference to the third aspect, in a possible implementation, the address indication information is further used to indicate a second length N.

With reference to the third aspect, in a possible implementation, the address indication information includes a prefix field and a length field, the prefix field includes the values of the $1^{st}$ bit to the $N^{th}$ bit of the IP address, and the length field is used to indicate the first length M and the second length N.

With reference to the third aspect, in a possible implementation, the length field includes a first subfield and a second subfield, the first subfield includes the first length M, and the second subfield includes the second length N; or the first subfield includes the first length M, and the second subfield includes a total length L of the address, where L is a sum of N and M; or the first subfield includes the second length N, and the second subfield includes a total length L of the address.

With reference to the third aspect, in a possible implementation, the address indication information is further used to indicate a subnet mask.

According to a fourth aspect, an embodiment of this application provides a network device, where the network device includes the units configured to implement the method in any one of the first aspect or the possible implementations of the first aspect.

According to a fifth aspect, an embodiment of this application provides a network device, where the network device includes the units configured to implement the method in any one of the second aspect or the possible implementations of the second aspect.

According to a sixth aspect, an embodiment of this application provides a network device, where the network device includes the units configured to implement the method in any one of the third aspect or the possible implementations of the third aspect.

According to a seventh aspect, an embodiment of this application provides a computer-readable storage medium, where the computer-readable storage medium stores an instruction used to implement the method in any one of the first aspect or the possible implementations of the first aspect.

According to an eighth aspect, an embodiment of this application provides a computer-readable storage medium, where the computer-readable storage medium stores an instruction used to implement the method in any one of the second aspect or the possible implementations of the second aspect.

According to a ninth aspect, an embodiment of this application provides a computer-readable storage medium, where the computer-readable storage medium stores an instruction used to implement the method in any one of the third aspect or the possible implementations of the third aspect.

According to a tenth aspect, this application provides a computer program product including an instruction. When the computer program product is run on a computer, the computer is enabled to perform the method in any one of the first aspect or the possible implementations of the first aspect.

According to an eleventh aspect, this application provides a computer program product including an instruction. When the computer program product is run on a computer, the computer is enabled to perform the method in any one of the second aspect or the possible implementations of the second aspect.

According to a twelfth aspect, this application provides a computer program product including an instruction. When the computer program product is run on a computer, the computer is enabled to perform the method in any one of the third aspect or the possible implementations of the third aspect.

BRIEF DESCRIPTION OF DRAWINGS

FIG. 9 is an example target table discussed in embodiments of this application.

DESCRIPTION OF EMBODIMENTS

Figure 1:
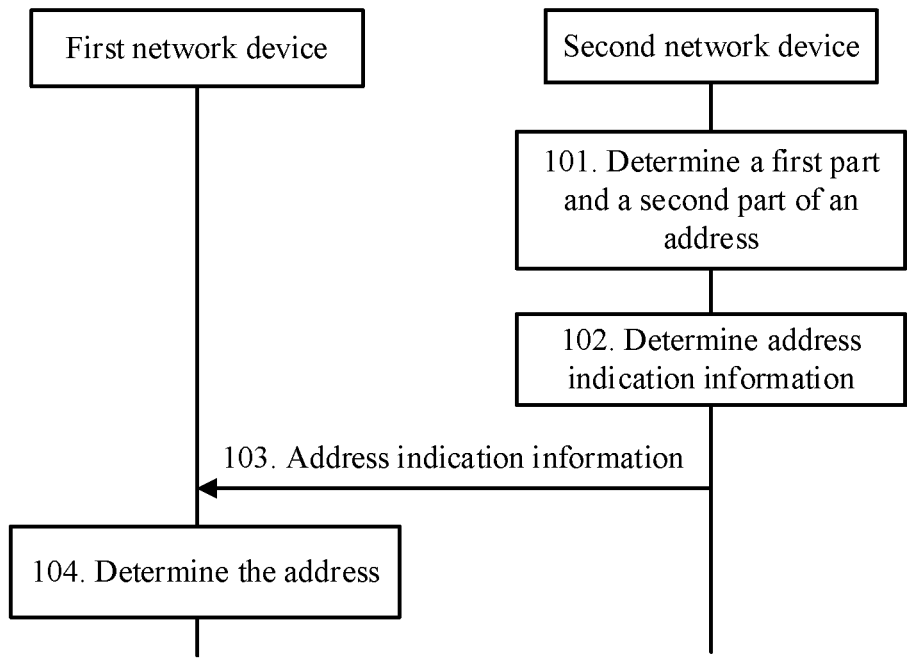
FIG. 1 is a schematic flowchart of an address transmission method according to an embodiment of this application.

The following describes technical solutions of this application with reference to accompanying drawings.

To help a person skilled in the art better understand the embodiments of this application, some concepts in the embodiments of this application are first described.

Unless otherwise specified, an address mentioned in the embodiments of this application may be a complete address, or may be a part of a complete address. For example, the address mentioned in the embodiments of this application may be an IPv4 address, an IPv6 address, an IP address in a variable-length IP address system, or an MAC address. For another example, the address mentioned in the embodiments of this application may be a prefix (prefix) of an IP address.

For still another example, the address mentioned in the embodiments of this application may be a host identifier of an IP address. For yet another example, the address mentioned in the embodiments of this application may be a global prefix (global prefix) of an IP address in a variable-length IP address system, or may be a local address (local suffix) of an IP address in a variable-length IP address system. The address mentioned in the embodiments of this application may alternatively be an address obtained after an invalid part is removed. The invalid part is the part of the address before the $1^{st}$ bit whose value is 1. An IP address 1.128.0 in dot-decimal notation is used as an example. A complete address of the address is 00000001100000000000000, and an address obtained after the invalid part is removed is 11000000000000000.

An IP address is a digital label assigned to a device that performs communication in a network that uses the Internet Protocol. IPv4 is the fourth version of the Internet Protocol and is the first widely used protocol that forms a basis of today's Internet technologies. It is specified that an IPv4 address has a length of 32 bits. Theoretically, IPv4 can provide a maximum of about 4.29 billion IP addresses. However, with continuous development of the Internet and gradual expansion of the Internet, more and more devices are deployed on the Internet, and there are not enough IPv4 addresses to be assigned to all the devices that access the Internet.

To solve this problem, a variable-length IP address system is proposed in the industry. The variable-length IP address includes two parts: a global prefix (global prefix) and a local address (local suffix). Both lengths of the local address and the global prefix are assigned by an address management organization. Specific content of the local address is decided by the owner of the global prefix. In this way, an address space can be increased without limitation by extending the global prefix.

For example, if a prefix 128 (in decimal notation) and an 8-bit local address space are assigned to an organization A, a specific IP address of the organization A may be represented as 128.x, where x is a value that can be represented by 8 bits, that is, 0 to 255.

For ease of understanding, in all specific examples in the embodiments of this application, description is provided by using an IP address as an example. A person skilled in the art may understand that, for ease of description, an IP address, such as 1.128.0 or 192.168.1.1, is generally described in dot-decimal notation. However, when a network device in a network needs to release an IP address to another network device in the network, the network device transmits the IP address in binary notation. It is assumed that when a network device A transmits the IP address 1.128.0 to a network device B, the network device A sends the IP address in binary notation, that is, 00000001.10000000.00000000, to the network device B. The IP addresses in the foregoing example are expressed in eight bits in dot-decimal notation. The IP address may also use any other length as a basic unit in dot-decimal notation. For example, an IP address expressed in four bits in dot-decimal notation may be 8.15.0, and correspondingly is 1000.1111.0000 in binary notation. For another example, an IP address expressed in six bits in dot-decimal notation may be 32.63.0, and correspondingly is 100000.111111.000000 in binary notation. For ease of description, in an embodiment shown in FIG. 1, an IP address is expressed in eight bits in dot-decimal notation.

The term "length" mentioned in the embodiments of this application refers to a quantity of bits. For example, if the length of an IP address is 32, it indicates that the IP address includes 32 bits. For another example, if the length of an IP address is 128, it indicates that the IP address includes 128 bits. For still another example, if the length of a prefix of an IP address is 16, it indicates that the prefix of the IP address includes 16 bits. For example, the length of an IP address 1.128.0 represented in dot-decimal notation in a unit of 8 bits is 24, that is, the IP address includes 24 bits.

An IP address transmission method provided in the embodiments of this application may be applied to any scenario in which an IP address needs to be transmitted. For example, a router A in a system that uses the Border Gateway Protocol (BGP) may send an IP address that needs to be released to a router B by using the method provided in the embodiments of this application.

A network device mentioned in the embodiments of this application may be any device in a network, for example, a router, a server, or a terminal device. For example, a first network device may be a router in the network, and a second network device may be another router in the network. For another example, the first network device may be a terminal device accessing a network, and the second network device may be a router in the network. For still another example, the first network device may be a server in a network, and the other network device may be a router in the network. The terminal device mentioned in the embodiments of this application may be a computer, a tablet computer, a mobile phone, or the like.

It can be understood that the "first" and "second" in the first network device and the second network device in the embodiments of this application are merely used to distinguish between different network devices, but are not intended to limit a function of the network device. A network device may serve as the first network device, or may serve as the second network device. It is assumed that a network includes two routers: a router A and a router B. If the router A sends address indication information to the router B, the router A may be the second network device, and the router B may be the first network device. If the router B sends address indication information to the router A, the router A may be the first network device, and the router B may be the second network device.

FIG. 1 is a schematic flowchart of an address transmission method according to an embodiment of this application.

101. A second network device determines a first part and a second part of an address.

The address may be any address that needs to be sent by the second network device to a first network device. For example, the address may be an address of the second network device. For another example, the address may be an address, forwarded by the second network device, of another device in the network. For still another example, the address may be an address that needs to be provided by the second network device for the first network device for use.

Specifically, the length of the address may be L. The address may include a first part and a second part. The first part is the $1^{st}$ bit to the $N^{th}$ bit of the address, and the second part is the $(N+1)^{th}$ bit to the $L^{th}$ bit of the address. In other words, the length of the first part of the address is N, and the length of the second part of the address is (L−N). For ease of description, it is assumed that M is equal to (L−N), where both N and M are positive integers greater than or equal to 1. In other words, L is a sum of M and N. The length of the second part is M. Values of the M bits that form the second part are all preset values.

Optionally, in a first solution, the second network device may determine the first part and the second part of the address in the following manner: determining that the first part that starts with the $1^{st}$ bit of the address to the last "1" bit of the address; and determining that the second part is the bits of the address except the first part. In other words, in this case, the $N^{th}$ bit of the address is the last bit in the address whose last bit value is 1. Values of an $(N+1)^{th}$ bit to the last bit of the address are all preset values. For ease of description, the foregoing manner is referred to as a first solution in the following.

Optionally, in a second solution, the second network device may further determine the first part of the address and the second part of the address based on a subnet mask of the address. Specifically, assuming that the subnet mask of the address is N, the first part of the address is the $1^{st}$ bit of the address to the $N^{th}$ bit of the address, and the second part of the address is the $(N+1)^{th}$ bit of the address to the $L^{th}$ bit of the address. It can be understood that, in this case, the address is an IP address. For ease of description, the foregoing manner is referred to as a second solution in the following.

Optionally, in some embodiments, the preset value may be 0. Optionally, in other embodiments, the preset value may be 1. Optionally, in still other embodiments, the preset value may be another value, for example, a cycle of 0 and 1. For example, if M is equal to 5, the second part may be 01010. For another example, if M is equal to 6, the second part may be 010101.

Optionally, in some embodiments, a preset value may be a complete address.

An IP address 1.128.0 in dot-decimal notation is used as an example. A complete address of the address is 000000011000000000000000. The first part of the address determined using the first solution is the $1^{st}$ bit to the $9^{th}$ bit of the address, that is, 000000011; and the second part of the address determined by using the first solution is the $10^{th}$ bit to the $24^{th}$ bit of the address. If using the second solution and a subnet mask of the address is 12, the first part of the address determined by using the second solution is the $1^{st}$ bit to the $12^{th}$ bit of the address, that is, 000000011000; and the second part of the address determined by using the second solution is the $13^{th}$ bit to the $24^{th}$ bit of the address.

An IP address 1.129.0 in dot-decimal notation is used as an example. A complete address of the address is 000000011000000100000000. The first part of the address determined by using the first solution is the $1^{st}$ bit to the $16^{th}$ bit of the address, that is, 0000000110000001; and the second part of the address determined by using the first solution is the $17^{th}$ bit to the $24^{th}$ bit of the address. If using the second solution and a subnet mask of the address is 16, the first part of the address determined by using the second solution is the $1^{st}$ bit to the $16^{th}$ bit of the address, that is, 0000000110000001; and the second part of the address determined by using the second solution is the $17^{th}$ bit to the $24^{th}$ bit of the address.

Optionally, in other embodiments, the address may be an address after an invalid part is removed. The invalid part is the part of the address before the $1^{st}$ bit whose value is 1. Correspondingly, a subnet mask N is a value obtained after the invalid part is removed. Removing the invalid part of the address can further reduce the length of address indication information.

An IP address 1.128.0 in dot-decimal notation is used as an example. A complete address of the address is 000000011000000000000000, and an address obtained after an invalid part is removed is 11000000000000000. The first part of the address determined by using the first solution is the $1^{st}$ bit and the $2^{nd}$ bit of the address, that is, 11; and the second part of the address determined by using the first solution is the $3^{rd}$ bit to the $17^{th}$ bit of the address. If a subnet mask of the complete address is 12, a value of the subnet mask of the address obtained after the first seven bits of the invalid part are removed is 5. The first part of the address determined by using the second solution is the $1^{st}$ bit to the $5^{th}$ bit of the address, that is, 11000; and the second part of the address determined by using the second solution is the $6^{th}$ bit to the $17^{th}$ bit of the address.

An IP address 1.129.0 in dot-decimal notation is used as an example. A complete address of the address is 000000011000000100000000, and an address obtained after an invalid part is removed is 11000000100000000. The first part of the address determined by using the first solution is the $1^{st}$ bit to the $9^{th}$ bit of the address, that is, 000000011000001; and the second part of the address determined by using the first solution is the $10^{th}$ bit to the $17^{th}$ bit of the address. If a subnet mask of the complete address is 16, a value of the subnet mask of the address obtained after the first 7 bits of the invalid part are removed is 9. T first part of the address determined by using the second solution is the $1^{st}$ bit to the $9^{th}$ bit of the address, that is, 110000001; and the second part of the address determined by using the second solution is the $10^{th}$ bit to the $17^{th}$ bit of the address.

Optionally, in other embodiments, the address may be a part of a complete address, for example, a prefix (prefix) of an IP address, a host identifier (host identifier) of an IP address, a global prefix (global prefix) of an IP address in a variable-length IP address system, or a local address (local suffix) of an IP address.

The address is assumed to be a local address. An IP address 192.1.1.1.128.0 in dot-decimal notation is used as an example, and 1.128.0 is the local address of the IP address. The address is expressed as 000000011000000000000000 in binary notation. The first part of the address determined by using the first solution is the $1^{st}$ bit to the $9^{th}$ of the address, that is, 000000011; and the second part of the address determined by using the first solution is the $10^{th}$ bit to the $24^{th}$ bit of the address. If using the second solution and a subnet mask of the address is 12, the first part of the address determined by using the second solution is the $1^{st}$ bit to the $12^{th}$ bit of the address, that is, 000000011000; and the second part of the address determined by using the second solution is the $13^{th}$ bit to the $24^{th}$ bit of the address.

102. The second network device determines address indication information, where the address indication information is used to indicate values of the $1^{st}$ bit to the $N^{th}$ bit of the address and a first length M.

103. The second network device sends the address indication information to the first network device.

A BGP network is used as an example. The address indication information may be carried in an update message. Specifically, the update message may carry network layer reachability information (NLRI), and the NLRI information is the address indication information.

104. The first network device determines the address based on the address indication information.

The address indication information may directly indicate the values of the $1^{st}$ bit to the $N^{th}$ bit of the address. Therefore, the address indication information may include a prefix field. The prefix field includes the values of the $1^{st}$ bit to the $N^{th}$ bit of the address. In other words, the prefix field includes the value of each bit of the first part of the address.

For example, assuming that the first part of the address is 000000011, the content of the prefix field is 000000011. If the first part of the address is 11, the content of the prefix field is 11.

The first length M is the length of the second part of the address. In other words, the first length M is a quantity of bits included in the second part of the address. For example, if the second part of the address is the 17$^{th}$ bit to the 24$^{th}$ bit of the address, the value of M is 8. For another example, if the second part of the address is the 10$^{th}$ bit to the 24$^{th}$ bit of the address, the value of M is 15. Therefore, the first network device may determine, based on the value of M, a quantity of preset values to be supplemented after the N$^{th}$ bit.

Optionally, in some embodiments, the address indication information may further indicate a second length N. In this case, after receiving the address indication information, the first network device may determine, based on the second length N, that the address indication information includes values of the N bits. The first network device may determine that the values of the 1$^{st}$ bit to the N$^{th}$ bit of the address are the values of the 1$^{st}$ bit to the N$^{th}$ bit of the address that are indicated by the address indication information. In other words, after receiving the address indication information, the first network device may determine the quantity of bits that need to be read and that are used to indicate the address. More specifically, the length of a field in the address indication information except the prefix field is fixed. In other words, the length of the prefix field is variable. For example, the address indication information includes a prefix field and a length field. The length field may indicate the second length N. Optionally, in some embodiments, in the address indication information, the length field is located before the prefix field, or a subfield that is in the length field and that is used to indicate the second length is located before the prefix field. In this way, the first network device can determine, based on the length field, that content indicated by N bits that are located after the length field are the values of the 1$^{st}$ bit to the N$^{th}$ bit of the address.

Optionally, in some embodiments, the address indication information may directly indicate the first length M and directly indicate the second length N. Specifically, the address indication information may include the prefix field and the length field. Specific content of the prefix field is as described above, and details are not repeated herein again. The length field includes a first subfield and a second subfield. The first subfield includes the first length M. The second subfield includes the second length N. In the foregoing two examples, the value of M is a decimal value. It can be understood that, similar to a transmission address, the first length M included in the first subfield is a binary value of M, and the second length N included in the second subfield is a binary value of N. If the second part of the address is the 17$^{th}$ bit to the 24$^{th}$ bit of the address, the content of the first subfield is 1000. If the second part of the address is the 10$^{th}$ bit to the 24$^{th}$ bit of the address, the content of the first subfield is 1111. If the length of the first part of the address is 8, content included in the second subfield is 1000.

Optionally, in some embodiments, the address indication information may directly indicate the first length and indirectly indicate the second length. Specifically, the address indication information may include a prefix field and a length field. Specific content of the prefix field is as described above, and details are not repeated herein again. The length field includes a first subfield and a second subfield. The first subfield includes the first length M. The second subfield includes a total length L of the address. In the foregoing two examples, a value of M is a decimal value. It can be understood that, similar to a transmission address, the first length M included in the first subfield is a binary value of M, and the total length L of the address included in the second subfield is a binary value of L. If the second part of the address is the 17$^{th}$ bit to the 24$^{th}$ bit of the address, content of the first subfield is 1000. If the second part of the address is the 10$^{th}$ bit to the 24$^{th}$ bit of the address, content of the first subfield is 1111. If a total length of the address is 24, the content included in the second subfield is 11000. When receiving the address indication information, the first network device may calculate the second length N based on the total length L of the address indicated by the address indication information and the first length M. Specifically, the first network device may determine that the second length N is a difference between L and M.

Optionally, in some embodiments, the address indication information may directly indicate the second length and indirectly indicate the first length. Specifically, the address indication information may include a prefix field and a length field. Specific content of the prefix field is as described above, and details are not repeated herein again. The length field includes a first subfield and a second subfield. The first subfield includes the second length N. The second subfield includes a total length L of the address. It can be understood that, similar to a transmission address, the second length N included in the first subfield is a binary value of N, and the total length L of the address included in the second subfield is a binary value of L. If a length of the first part of the address is 8, the content included in the first subfield is 1000. If a total length of the address is 24, content included in the second subfield is 11000. When receiving the address indication information, the first network device may calculate the first length M based on the total length L of the address indicated by the address indication information and the second length N. Specifically, the first network device may determine that the first length M is a difference between L and N.

Figure 2:
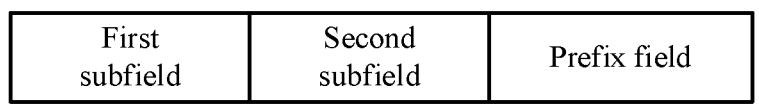
FIG. 2 is a schematic diagram of the address indication information.
Figure 3:
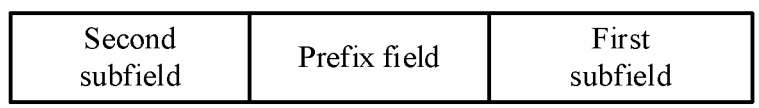
FIG. 3 is another schematic diagram of the address indication information.

As described above, in some embodiments, a length of the length field is fixed, and a length of the prefix field is variable. In the address indication information, the length field is located before the prefix field, or a subfield that is in the length field and that is used to indicate the second length is located before the prefix field. In this way, the first network device can determine, based on the length field, that the content indicated by N bits that are located after the length field are the values of the 1$^{st}$ bit to the N$^{th}$ bit of the address. For example, FIG. 2 is a schematic diagram of address indication information. As shown in FIG. 2, the address indication information sequentially includes the first subfield, the second subfield, and the prefix field. It can be seen that the first subfield and the second subfield in the address indication information shown in FIG. 2 are consecutive, and the first subfield is located before the second subfield. Certainly, in other embodiments, the second subfield may alternatively be located before the first subfield. For another example, FIG. 3 is another schematic diagram of the address indication information. As shown in FIG. 3, the address indication information sequentially includes the second subfield, the prefix field, and the first subfield.

Optionally, in other embodiments, when the length of the length field is fixed and the length of the prefix field is variable, the length field may also be located after the prefix field. Specifically, the first network device may identify the part of a received character string that indicates the address indication information. For example, as specified in a protocol, all content sent by the second network device to the first network device in some cases is the address indication information. For another example, a flag field is set before the address indication information and after the address indication information. After the first network device receives a character string, the first network device may determine the address indication information part of the character string based on the flag field. After determining the address indication information part, the first network device may determine the second length N based on the length field that are located after the address indication information and then determine that content indicated by N bits that are located before the length field is the values of the $1^{st}$ bit to the $N^{th}$ bit of the address.

Optionally, in other embodiments, the address indication information may not need to indicate the second length N.

For example, in some embodiments, the second length N may be a fixed value. For example, the first network device and the second network device may negotiate a value of N in advance, and then the second network device determines the first part and the second part of the address based on the negotiated value of N. In this case, after receiving the address indication information, the first network device may directly determine that the address indication information indicates values of the N bits, then determine that the values of the $1^{st}$ bit to the $N^{th}$ bit of the address are the values indicated by the address indication information, and determine, based on the first length M indicated by the address indication information, that the values of the $(N+1)^{th}$ bit to the $(N+M)^{th}$ bit of the address are the preset values.

For another example, in some embodiments, the length of the length field is fixed, the length of the prefix field is variable, and the first network device may identify the part of a received character string that represents the address indication information. In this case, the length field indicates only the first length M. For example, as specified in a protocol, all content sent by the second network device to the first network device in some cases is the address indication information. For another example, a flag field is set before the address indication information and after the address indication information. After the first network device receives a character string, the first network field may determine the address indication information part of the character string based on the flag field. After determining the address indication information part, the first network device may determine that the content in the address indication information except the length field is the values of the N bits of the first part of the address that are indicated by the address indication information. For example, it is assumed that a length of the length field of the address indication information is eight bits, and the length field is located before the prefix field. If the first network device identifies the address indication information, the first network device may determine that all the bits of the address indication information except the first eight bits are the values indicating the $1^{st}$ bit to the $N^{th}$ bit of the address. In other words, the first network device may determine that the part of the address indication information except the first eight bits is the prefix field of the address indication information.

Based on the foregoing technical solution, during address transmission, the second network device does not need to send a specific value of each bit of the address to the first network device. In this way, a quantity of transmitted bits can be reduced. Thanks to the reduced quantity of the transmitted bits, the address may be transmitted faster, and a probability of transmission errors is reduced. In addition, in the prior art, an address release method depends on the feature that the address length is fixed. Consequently, if the address length is not fixed, an address cannot be transmitted by the prior art. Therefore, the foregoing technical solution may be used in a network in which the address length is not a fixed value. For example, a variable-length IP address system is used in the network. For another example, some IP addresses in the network are IPv4 addresses, and other IP addresses are IPv6 addresses. If the prior-art solution is used, a receive-end device cannot normally parse out the IP address.

Optionally, in some embodiments, if the address is a complete IP address or a prefix of an IP address, the address indication information may further indicate a subnet mask of the address. Optionally, in some embodiments, if the first part and the second part of the address are determined by using the second solution (that is, the length of the first part is equal to the subnet mask), a value indicated by a field that is in the address indication information and that indicates the second length N is the subnet mask.

Further, after receiving the address, the first network device may continue to process the address. The first network device may process the address according to the method shown in FIG. 4.

Figure 4:
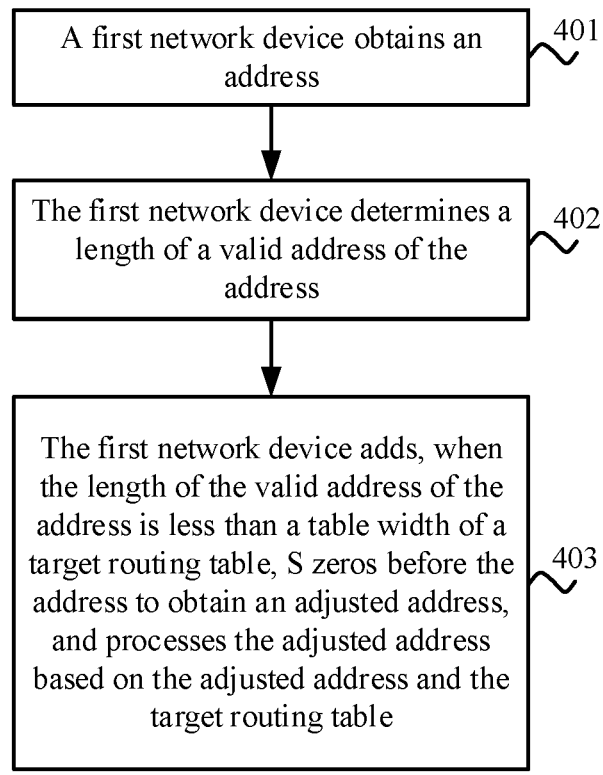
FIG. 4 is a schematic flowchart of an address processing method according to an embodiment of this application.

FIG. 4 is a schematic flowchart of an address processing method according to an embodiment of this application.

401. A first network device obtains an address.

Optionally, in some embodiments, the first network device may obtain the address by using the method shown in FIG. 1.

Optionally, in other embodiments, the first network device may also obtain the address in other manners. For example, a second network device may directly send the address to the first network device in a complete form.

402. The first network device determines a length of a valid address of the address, where the valid address of the address starts from the $1^{st}$ bit of the address whose bit value is 1 to the last bit of the address.

For example, an IP address 1.128.0 in dot-decimal notation is used as an example. A complete address of the address is 000000011000000000000000. A valid address of the address is: 11000000000000000. Therefore, the valid length of the IP address is 17.

403. The first network device adds, when the length of the valid address of the address is less than a table width of a target table, S zeros before the valid address of the address to obtain an adjusted address; and processes the adjusted address based on the adjusted address and the target table, where S is a difference between the table width of the target table and the length of the address. The target table includes at least one entry, each of the at least one entry includes a destination address, and the table width of the target table is a total quantity of bits occupied by one destination address stored in the target table.

An IP address 1.128.0 in dot-decimal notation is used as an example. A complete address of the address is 000000011000000000000000. A valid address of the address is: 11000000000000000. Assuming that the table width of the target table is 32 bits, 15 zeros need to be added before the address to obtain an adjusted address. The adjusted address is expressed as 0.1.128.0 in dot-decimal notation. The first network device may process the adjusted address based on the adjusted address and the target table.

Based on the technical solution shown in FIG. 4, the length of the address obtained and processed by the first network device may not be equal to the table width of the target table. In other words, the length of an address transmitted in a network may be different from a table width of a table stored in the network device. In this way, the manner of transmitting an address by a network device in a network may be more flexible. In addition, the length of the transmitted address may be one or more invalid bits less than the table width of the target table. This can reduce the length of the transmitted address. In this way, resources occupied by address transmission can be reduced, and data transmission efficiency in the network can be improved.

It can be understood that, if the length of the valid address of the address is equal to the table width of the target table, the first network device may directly process the valid address of the address based on the valid address of the address and the target table.

An IP address 172.16.1.0 in dot-decimal notation is used as an example. A complete address of the IP address is: 10101100000100000000000100000000. A valid length of the IP address is equal to the length of the IP address. It is assumed that the table width of the target table is 32 bits. It can be learned that the valid length of the IP address is the same as the table width of the target table. Therefore, the first network device may directly process the address based on the address and the target table.

Optionally, in some embodiments, the first network device may store only one table. In this case, the table stored in the first network device is the target table.

Optionally, in other embodiments, the first network device may store a plurality of tables (that is, two or more tables). In this case, the first network device needs to first determine the target table, and then determine the adjusted address. In other words, before the first network device adds, when the length of the address is less than the table width of the target table, the S zeros before the address to obtain the adjusted address, the first network device further needs to determine the target table.

Similar to the target table, each table stored by the first network device includes at least one entry, each of the at least one entry includes a destination address, and the table width of the table is the total quantity of bits occupied by one destination address stored in the table.

When the first network device stores a plurality of tables, table widths of different tables stored by the first network device are different.

For example, the first network device may store three tables: Table a, Table b, and Table c. A table width of Table a is 16 bits, a table width of Table b is 32 bits, and a table width of Table c is 64 bits. In other words, a quantity of bits for storing a destination address in an entry of Table a is 16, a quantity of bits for storing the destination address in an entry of Table b is 32, and a quantity of bits for storing the destination address in an entry of Table c is 64.

Optionally, in some embodiments, the first network device may determine the target table based on the length of the valid address of the address.

Specifically, the first network device may determine the length of the valid address of the address. The valid address of the address is the part of the address that starts from the $1^{st}$ bit whose bit value is 1 to the last bit of the address. For example, an IP address 1.128.0 in dot-decimal notation is used as an example. A complete address of the address is 00000001100000000000000. A valid address of the address is 11000000000000000. Therefore, a valid length of the IP address is 17.

The first network device determines the target table by choosing the table with the smallest table width among all the tables whose table widths are greater than or equal to the length of the valid address of the address.

The foregoing Table a, Table b, and Table c are still used as examples. Therefore, if a valid length of the address is less than or equal to 16 bits, the first network device may determine that Table a is the target table; if a valid length of the address is greater than 16 bits and less than or equal to 32 bits, the first network device may determine that Table b is the target table; or if a valid length of the address is greater than 32 bits and less than or equal to 64 bits, the first network device may determine that Table c is the target table.

An IP address 1.128.0 in dot-decimal notation is used as an example. A complete address of the address is 00000001100000000000000. A valid address of the address is: 11000000000000000. Therefore, a valid length of the IP address is 17. 17 is greater than 16 and less than 32. Therefore, the table corresponding to the address is Table b.

According to the foregoing technical solution, the first network device may store a plurality of tables. The first network device may determine, based on the length of the valid address of the address, the target table corresponding to the address, and perform a subsequent operation based on the target table. In this way, the first network device may support an operation on addresses of different lengths. An IP address is used as an example. The first network device may store a table used to process an IPv4 address, and may also store a table used to process an IPv6 address. Alternatively, the first network device may store a table for processing IP addresses of different lengths in a variable-length IP address system.

The "table" stored in the network device mentioned in the embodiments of this application may be any table that can be used to process information carrying an address, for example, a routing table and an MAC address table. In addition to the destination address, the table may further include forwarding information. The forwarding information may have different names in different tables. For example, the forwarding information in the routing table may be referred to as a next hop (next hop). The forwarding information in the MAC address table may be referred to as a port (port). In addition to the destination address and the forwarding information, entries of different tables may further include other content. For example, an entry of the routing table may further include a subnet mask. For another example, an entry of the MAC address table may further include a virtual local area network (VLAN) identifier. For ease of description, a routing table is used as an example in the following specific embodiments.

Optionally, in some embodiments, the processing the adjusted address based on the adjusted address and the target table includes: determining a destination address, corresponding to the adjusted address, in the target table.

Table 1 is an example of a routing table. The routing table shown in Table 1 includes three entries. Each entry includes a destination address, a subnet mask, and a next hop.

TABLE 1

| Address | Subnet Mask | Next Hop |
|---------|-------------|----------|
| 0.16.1.0 | 24 | Router A |
| 0.16.2.0 | 24 | Router B |
| 0.16.0.0 | 16 | Discard |

It is assumed that the routing table shown in Table 1 is a target table, an example of which is shown in FIG. 9. If the destination address corresponding to the adjusted address in the target table is a destination address in the first entry in Table 1 (that is, 0.16.1.0, referred to as an address 1 in the following), the first network device may forward a message carrying the address to the router A. If the destination address corresponding to the adjusted address in the target table is a destination address in the second entry in Table 1 (that is, 0.16.2.0, referred to as an address 2 in the following), the first network device may forward a message carrying the address to the router B. If the destination address corresponding to the adjusted address in the target table is a destination address in the third entry in Table 1 (that is, 0.16.0.0, referred to as an address 3 in the following), the first network device may discard a message carrying the address.

Optionally, if there is no destination address corresponding to the adjusted address in the target table, a message carrying the address may be processed according to a preset rule. For example, the preset rule may be discarding a message carrying the address. For another example, the preset rule may be sending a message carrying the address to a designated network device.

The first network device determines, from the target table based on a matching principle such as a longest match principle, a shortest match principle, or a fuzzy match principle, the destination address corresponding to the adjusted address.

The following uses the longest match principle as an example for description.

The routing table shown in Table 1 and an IP address 16.2.1 in dot-decimal notation are used as an example (for ease of description, the IP address is referred to as a to-be-matched IP address in the following). It is assumed that the routing table is a target table of the to-be-matched IP address. A table width of the routing table is 32 bits, and a length of the to-be-matched IP address is 24 bits. Therefore, the adjusted address of the to-be-matched IP address needs to be determined. The adjusted address of the to-be-matched IP address is 0.162.2.1 (in dot-decimal notation).

Table 2 shows dotted decimal values and binary values of the three IP addresses in the routing table and a dotted decimal value and a binary value of the adjusted address of the to-be-matched IP address.

TABLE 2

| | |
|---|---|
| 0.16.1.0 | 00000000.00010000.00000001.00000000 |
| 0.16.2.0 | 00000000.00010000.00000010.00000000 |
| 0.16.0.0 | 00000000.00010000.00000000.00000000 |
| 0.16.2.1 | 00000000.00010000.00000010.00000001 |

Figure 6:
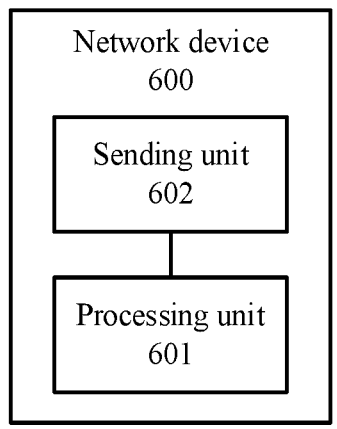
FIG. 6 is a structural block diagram of a network device according to an embodiment of this application.

A subnet mask of the address 1 is 24. In this case, the first 24 bits of the adjusted address of the to-be-matched IP address need to strictly match the first 24 bits of the address 1. In other words, the adjusted address of the to-be-matched IP address can match the address 1 only when the first 24 bits of the adjusted address of the to-be-matched IP address need to be the same as the first 24 bits of the address 1. As shown in FIG. 6, the $23^{rd}$ bit and $24^{th}$ bit of the adjusted address of the to-be-matched IP address are different from the $23^{rd}$ bit and $24^{th}$ bit of the address 1. Therefore, the adjusted address of the to-be-matched IP address does not match the address 1. A subnet mask of the address 2 is 24. In this case, the first 24 bits of the adjusted address of the to-be-matched IP address are exactly the same as the first 24 bits of the address 2. Therefore, the adjusted address of the to-be-matched IP address matches the address 2. A subnet mask of the address 3 is 16. In this case, the first 16 bits of the adjusted address of the to-be-matched IP address are exactly the same as the first 16 bits of the address 3. Therefore, the adjusted address of the to-be-matched IP address matches the address 3. In summary, the adjusted address of the to-be-matched IP address matches both the address 2 and the address 3. Further, the adjusted address of the to-be-matched IP address is the same as the first 31 bits of the address 2, and the adjusted address of the to-be-matched IP address is the same as the first 22 bits of the address 3. In this case, a matching length between the adjusted address of the to-be-matched IP address and the address 2 is greater than a matching length between the adjusted address of the to-be-matched IP address and the address 3. Therefore, the target address of the adjusted address of the to-be-matched IP address is the address 2.

Optionally, in other embodiments, the processing the adjusted address based on the adjusted address and the target table includes: creating an entry in the target table, where a destination address in the entry is the adjusted address.

Optionally, in some embodiments, the target table may be a table that has stored at least one entry.

For example, it is assumed that a received address is 0.16.3.0 in dot-decimal notation, and a subnet mask is 24. It is assumed that the routing table shown in Table 1 is the target table corresponding to the address. The first network device may decide to create a new forwarding entry on the target table. The destination address in the forwarding entry is 0.16.3.0, and the next hop is a router C. In this case, the routing table shown in Table 1 may be updated to the routing table shown in Table 3.

TABLE 3

| Address | Subnet Mask | Next Hop |
|---|---|---|
| 0.16.1.0 | 24 | Router A |
| 0.16.2.0 | 24 | Router B |
| 0.16.0.0 | 16 | Discard |
| 0.16.3.0 | 24 | Router C |

In this way, after receiving an address again, the first network device may perform processing based on the updated routing table. For example, if the received address matches 0.16.3.0, the message carrying the address may be forwarded to the router C.

Optionally, in some embodiments, the target table may be a table that has not yet stored any entry. In other words, the target table may be a new table created by the first network device.

For example, it is assumed that a received address is 176.16.3.0 in dot-decimal notation, and a subnet mask is 24. The first network device may create a new table. The table includes a forwarding entry, a destination address in the forwarding entry is 176.16.3.0, and the next hop is the router C. In this way, after receiving an address again, the first network device may perform processing based on the updated routing table. For example, if the received address matches 176.16.3.0, the message carrying the address may be forwarded to the router C.

Figure 5:
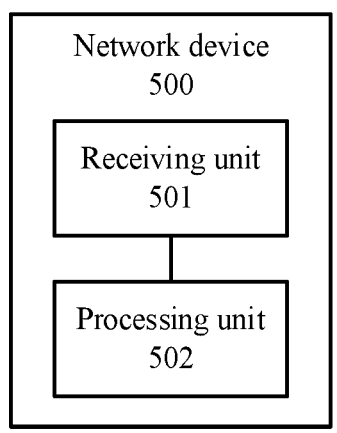
FIG. 5 is a structural block diagram of a network device according to an embodiment of this application.

FIG. 5 is a network device according to an embodiment of this application. As shown in FIG. 5, the network device 500 includes a receiving unit 501 and a processing unit 502. The network device shown in FIG. 5 may perform each step performed by the first network device in the method shown in FIG. 1.

The receiving unit 501 is configured to receive address indication information sent by a second network device. The address indication information is used to indicate values of the $1^{st}$ bit to the $N^{th}$ bit of the address and a first length M, and both N and M are positive integers greater than or equal to 1.

The processing unit 502 is configured to determine the address based on the address indication information. The address indication information is used to indicate the values of the $1^{st}$ bit to the $N^{th}$ bit of the address and the first length M, both N and M are positive integers greater than or equal to 1, the values of the $1^{st}$ bit to the $N^{th}$ bit of the address are the values of the $1^{st}$ bit to the $N^{th}$ bit of the address that are indicated by the address indication information, and the values of the $(N+1)^{th}$ bit to the $(N+M)^{th}$ bit of the address are preset values.

In a possible manner, the processing unit 502 may be implemented by a processor, and the receiving unit 501 may be implemented by a receiver.

Optionally, in some embodiments, the address indication information is further used to indicate a second length N, and the processing unit 502 is specifically configured to: determine, based on the second length N, that the N bits of the address indication information are respectively used to indicate the values of the $1^{st}$ bit to the $N^{th}$ bit of the address; determine that the values of the $1^{st}$ bit to the $N^{th}$ bit of the address are respectively the values of the N bits; and determine that the values of the $(N+1)^{th}$ bit to the $(N+M)^{th}$ bit of the address are the preset values.

Optionally, in some embodiments, the address indication information includes a prefix field and a length field, the prefix field includes the values of the $1^{st}$ bit to the $N^{th}$ bit of the address, and the length field is used to indicate the first length M and the second length N.

Optionally, in some embodiments, the length field includes a first subfield and a second subfield, the first subfield includes the first length M, and the second subfield includes the second length N; or the first subfield includes the first length M, and the second subfield includes a total length L of the address, where L is a sum of N and M; or the first subfield includes the second length N, and the second subfield includes a total length L of the address.

Optionally, in some embodiments, the network device 500 may further include a storage unit, and the storage unit is configured to store a target table. The storage unit may be implemented by a memory. The processing unit 502 is further configured to determine a length of a valid address of the address, where the valid address of the address starts from the $1^{st}$ bit, whose bit value is 1, of the address to the last bit of the address; add, when the length of the valid address of the address is less than a table width of the target table, S zeros before the valid address of the address to obtain an adjusted address; and process the adjusted address based on the adjusted address and the target table, where S is the difference between the table width of the target table and the length of the valid address of the address, the target table includes at least one entry, each of the at least one entry includes a destination address, and the table width of the target table is a total quantity of bits occupied by one destination address stored in the target table.

Optionally, in some embodiments, the storage unit is further configured to store a plurality of tables. The plurality of tables include the target table. The processing unit 502 is further configured to determine the target table before obtaining the adjusted address by adding the S zeros before the valid address of the address when the length of the valid address of the address is less than the table width of the target table, where the target table is the table with the smallest table width among all the table tables whose table widths are greater than or equal to the length of the valid address of the address.

Optionally, in some embodiments, the processing unit 502 is specifically configured to determine a destination address, corresponding to the adjusted address, in the target table.

Optionally, in some embodiments, the processing unit 502 is specifically configured to create an entry in the target table, where a destination address in the entry is the adjusted address.

For specific functions and beneficial effects of the receiving unit 501, the processing unit 502, and the storage unit, refer to the method shown in FIG. 1. Details are not described herein again.

FIG. 6 is a network device according to an embodiment of this application. As shown in FIG. 6, the network device 600 includes a processing unit 601 and a sending unit 602. The network device shown in FIG. 6 may perform each step performed by the second network device in the method shown in FIG. 1.

The processing unit 601 is configured to determine a first part and a second part of an address. The address includes the first part and the second part, the address length is L, and the first part is the $1^{st}$ bit to the $N^{th}$ bit of the address, the second part is an $(N+1)^{th}$ bit to an $L^{th}$ bit of the address, and values of the bits included in the second part are all zeros.

The processing unit 601 is further configured to determine address indication information. The address indication information is used to indicate values of the $1^{st}$ bit to the $N^{th}$ bit of the address and a first length M, where M is a difference between L and N, and both N and M are positive integers greater than or equal to 1.

The sending unit 602 is configured to send the IP address indication information to the first network device.

Optionally, in some embodiments, the $N^{th}$ bit of the address is the last bit of the address whose bit value is 1. The processing unit 601 is specifically configured to: determine that the first part is the $1^{st}$ bit of the address to the last bit of the address whose bit value is 1, of the IP address the bits are taken from, and determine that the second part is bits of the IP address except the first part.

Optionally, in some embodiments, a subnet mask of the address is N. The processing unit 601 is specifically configured for the second network device to determine that the first part is the $1^{st}$ bit to the $N^{th}$ bit of the address, and determine that the second part is the $(N+1)^{th}$ bit of the address to the $L^{th}$ bit of the IP address.

Optionally, in some embodiments, the address indication information further indicates a second length N.

Optionally, in some embodiments, the address indication information includes a prefix field and a length field, the prefix field includes values of the $1^{st}$ bit to the $N^{th}$ bit of the IP address, and the length field is used to indicate the first length M and the second length N.

Optionally, in some embodiments, the length field includes a first subfield and a second subfield. The first subfield includes the first length M, and the second subfield includes the second length N; or the first subfield includes the first length M, and the second subfield includes a total length L of the address, where L is a sum of N and M; or the first subfield includes the second length N, and the second subfield includes a total length L of the address.

In a possible manner, the processing unit 601 may be implemented by a processor, and the sending unit 602 may be implemented by a receiver. For specific functions and beneficial effects of the processing unit 601 and the sending unit 602, refer to the method shown in FIG. 1. Details are not described herein again.

Figure 7:
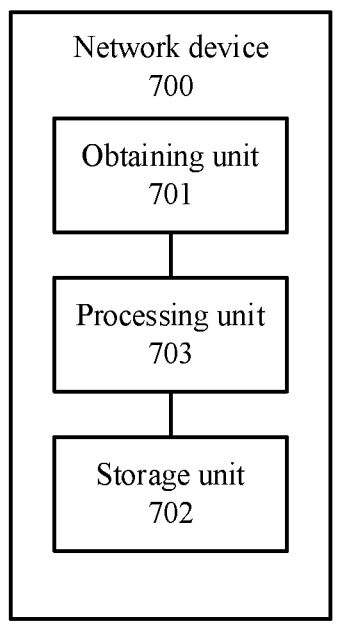
FIG. 7 is a structural block diagram of a network device according to an embodiment of this application.

FIG. 7 is a structural block diagram of a network device according to an embodiment of this application. As shown in FIG. 7, the network device 700 includes an obtaining unit 701, a storage unit 702, and a processing unit 703.

The obtaining unit 701 is configured to obtain an address.

The processing unit 703 is further configured to determine the length of a valid address of the address, where the valid address of the address is the $1^{st}$ bit of the address whose bit value is 1 to the last bit of the address.

The storage unit 702 is configured to store a target table.

The processing unit 703 is further configured to: add, when the length of the valid address of the address is less than a table width of the target table, S zeros before the valid address of the address to obtain an adjusted address; and process the adjusted address based on the adjusted address and the target table. S is a difference between the table width of the target table and the length of the valid address of the address. The target table includes at least one entry, each of the at least one entry includes a destination address, and the table width of the target table is the total quantity of bits in one destination address stored in the target table.

In a possible manner, the processing unit 703 may be implemented by a processor, the obtaining unit 701 may be implemented by a receiver, and the storage unit 702 may be implemented by a memory. For specific functions and beneficial effects of the obtaining unit 701, the storage unit 702, and the processing unit 703, refer to the method shown in FIG. 4. Details are not described herein again.

Figure 8:
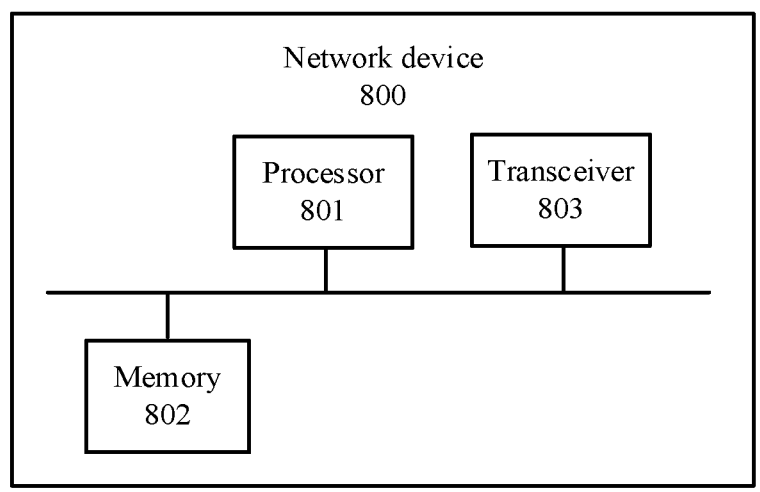
FIG. 8 is a structural block diagram of a network device according to an embodiment of this application.

FIG. 8 is a structural block diagram of a network device according to an embodiment of this application. As shown in FIG. 8, the network device includes a processor 801, a memory 802, and a transceiver 803. The processor 801 may be configured to: process communication data, control a network device, execute a software program, process data of the software program, and the like. The memory 802 is mainly configured to store the software program and the data.

When data needs to be sent, the processor 801 processes the to-be-sent data and outputs processed data to the transceiver 803. When data is sent to the network device, the transceiver 803 receives the data and outputs the data to the processor, and the processor processes the data. For ease of description, FIG. 8 shows only one memory and one processor. An actual terminal device product may include one or more processors and one or more memories. The memory may also be referred to as a storage medium, a storage device, or the like. The memory may be disposed independent of the processor, or may be integrated with the processor. This is not limited in the embodiments of this application.

In the embodiments of this application, a circuit that has sending and receiving functions may be considered as a transceiver 803 of a network device, and a processor that has a processing function may be considered as a processing unit of the network device. The transceiver may also be referred to as a transceiver unit, a transceiver, a transceiver apparatus, or the like. The processing unit may also be referred to as a processor, a processing board, a processing module, a processing apparatus, or the like. Optionally, a component for implementing a receiving function in the transceiver 803 may be considered as a receiving unit, and a component for implementing a sending function in the transceiver 803 may be considered as a sending unit. That is, the transceiver 803 includes a receiving unit and a sending unit. The receiving unit sometimes may also be referred to as a receiver, a receiving apparatus, a receiver circuit, or the like. The sending unit sometimes may also be referred to as a transmitter, a transmission apparatus, a transmission circuit, or the like.

The processor 801, the memory 802, and the transceiver 803 communicate with each other through an internal connection path, to transfer control and/or data signals.

The methods disclosed in the foregoing embodiments of the present invention may be applied to the processor 801, or implemented by the processor 801. The processor 801 may be an integrated circuit chip and has a signal processing capability. In an implementation process, steps in the foregoing methods may be implemented by using a hardware integrated logic circuit in the processor 801, or by using an instruction in a form of software.

The processor in the embodiments of this application may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of the present invention. The general-purpose processor may be a microprocessor, or the processor may be any conventional processor or the like. Steps of the methods disclosed with reference to the embodiments of the present invention may be directly executed and accomplished by using a hardware decoding processor, or may be executed and accomplished by using a combination of hardware and software modules of the decoding processor. A software module may be located in a storage medium mature in the art, such as a random access memory (RAM), a flash memory, a read-only memory (ROM), a programmable read-only memory, an electrically erasable programmable memory, or a register. The storage medium is located in the memory, and a processor reads an instruction in the memory and completes the steps in the foregoing methods in combination with hardware of the processor.

Optionally, in some embodiments, the memory 802 may store an instruction used to perform the method performed by the first network device in the method shown in FIG. 1. The processor 801 may execute the instruction stored in the memory 802, to complete, together with other hardware (such as the transceiver 803), the steps performed by the first network device in the method shown in FIG. 1. For specific working processes and beneficial effects, refer to the description of the embodiment shown in FIG. 1.

Optionally, in some embodiments, the memory 802 may store an instruction used to perform the method performed by the second network device in the method shown in FIG. 1. The processor 801 may execute the instruction stored in the memory 802, to complete, together with other hardware (such as the transceiver 803), the steps performed by the second network device in the method shown in FIG. 1. For specific working processes and beneficial effects, refer to the description of the embodiment shown in FIG. 1.

Optionally, in some embodiments, the memory 802 may store an instruction used to perform the method performed by the first network device in the method shown in FIG. 4. The processor 801 may execute the instruction stored in the memory 802, to complete, together with other hardware (such as the transceiver 803), the steps performed by the first network device in the method shown in FIG. 4. For specific working processes and beneficial effects, refer to the description of the embodiment shown in FIG. 4.

Optionally, in some embodiments, the memory 802 may further store a target table.

Optionally, in some embodiments, the memory 802 may further store a plurality of tables, where the plurality of tables include the target table.

An embodiment of this application further provides a chip. The chip includes a transceiver unit and a processing unit. The transceiver unit may be an input/output circuit or a communications interface. The processing unit is a processor, a microprocessor, or an integrated circuit integrated into the chip. The chip may perform the method performed by the first network device in the method embodiment shown in FIG. 1.

An embodiment of this application further provides a chip. The chip includes a transceiver unit and a processing unit. The transceiver unit may be an input/output circuit or a communications interface. The processing unit is a processor, a microprocessor, or an integrated circuit integrated into the chip. The chip may perform the method performed by the second network device in the method embodiment shown in FIG. 1.

An embodiment of this application further provides a chip. The chip includes a transceiver unit and a processing unit. The transceiver unit may be an input/output circuit or a communications interface. The processing unit is a processor, a microprocessor, or an integrated circuit integrated into the chip. The chip may perform the method performed by the first network device in the method embodiment shown in FIG. 4.

An embodiment of this application further provides a computer-readable storage medium. The computer-readable storage medium stores an instruction, and when the instruction is executed, the method performed by the first network device in the method embodiment shown in FIG. 1 is performed.

An embodiment of this application further provides a computer program product including an instruction. When the instruction is executed, the method performed by the first network device in the method embodiment shown in FIG. 1 is performed.

An embodiment of this application further provides a computer-readable storage medium. The computer-readable storage medium stores an instruction, and when the instruction is executed, the method performed by the second network device in the method embodiment shown in FIG. 1 is performed.

An embodiment of this application further provides a computer program product including an instruction. When the instruction is executed, the method performed by the second network device in the method embodiment shown in FIG. 1 is performed.

An embodiment of this application further provides a computer-readable storage medium. The computer-readable storage medium stores an instruction, and when the instruction is executed, the method performed by the first network device in the method embodiment shown in FIG. 4 is performed.

An embodiment of this application further provides a computer program product including an instruction. When the instruction is executed, the method performed by the first network device in the method embodiment shown in FIG. 4 is performed.

A person of ordinary skill in the art should understand that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate components may or may not be physically separate, and components displayed as units may or may not be physical units, may be located in one position, or may be distributed on a plurality of network units. Some or all of the units may be selected based on actual requirements to achieve the objectives of the solutions of the embodiments.

In addition, the functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An address processing method, wherein the method comprises:
    obtaining, by a first network device via a network communicatively coupled to the first network device, an address;
    determining, by the first network device, a length of a valid address of the address, wherein the valid address of the address is from a $1^{st}$ bit of the address whose bit value is 1 to a last bit of the address; and
    adding, by the first network device when the length of the valid address of the address is less than a table width of a target table stored in the first network device, S number of zeros before the valid address of the address to obtain an adjusted address, and processing the adjusted address based on the adjusted address and the target table, wherein S is a difference between the table width of the target table and the length of the valid address of the address, the target table comprises at least one entry, each of the at least one entry comprises a destination address, and the table width of the target table is a total quantity of bits occupied by one destination address stored in the target table.

2. The method according to claim 1, wherein before the adding, by the first network device when the length of the valid address of the address is less than the table width of the target table, the S number of zeros before the valid address of the address to obtain the adjusted address, the method further comprises:
determining, by the first network device, the target table, wherein the target table is a table with a smallest table width among all tables stored in the first network device whose table widths are greater than or equal to the length of the valid address of the address.

3. The method according to claim 1, wherein the processing the adjusted address based on the adjusted address and the target table comprises: determining the destination address that corresponds to the adjusted address.

4. The method according to claim 1, wherein the processing the adjusted address based on the adjusted address and the target table comprises: creating the at least one entry in the target table, wherein a destination address in each of the at least one entry is the adjusted address.

5. The method according to claim 1, wherein the obtaining, by the first network device, the address comprises:
receiving, by the first network device, address indication information sent by a second network device, the address indication information comprising a prefix field and a length field, wherein the address indication information is used to indicate values of the $1^{st}$ bit to the $N^{th}$ bit of the address and a first length M, and both N and M are positive integers greater than or equal to 1; and
determining, by the first network device, the address based on the address indication information, wherein the values of the $1^{st}$ bit to the $N^{th}$ bit of the address are the values of the $1^{st}$ bit to the $N^{th}$ bit of the address that are indicated by the address indication information, and values of an $(N+1)^{th}$ bit to an $(N+M)^{th}$ bit of the address are preset values.

6. The method according to claim 5, wherein the address indication information is further used to indicate a second length N, and the determining, by the first network device, the address based on the address indication information comprises:
determining, by the first network device based on the second length N, that the N bits of the address indication information are respectively used to indicate the values of the $1^{st}$ bit to the $N^{th}$ bit of the address;
determining, by the first network device, that the values of the $1^{st}$ bit to the $N^{th}$ bit of the address are respectively the values of the N bits; and
determining, by the first network device, that the values of the $(N+1)^{th}$ bit to the $(N+M)^{th}$ bit of the address are the preset values.

7. The method according to claim 6, wherein the prefix field comprises the values of the $1^{st}$ bit to the $N^{th}$ bit of the address, and the length field is used to indicate the first length M and the second length N.

8. The method according to claim 7, wherein the length field comprises a first subfield and a second subfield, wherein
the first subfield comprises the first length M, and the second subfield comprises the second length N;
the first subfield comprises the first length M, and the second subfield comprises a total length L of the address, wherein L is a sum of N and M; or
the first subfield comprises the second length N, and the second subfield comprises the total length L of the address.

9. A network device, wherein the network device comprises one or more processors and a storage medium, wherein:
the one or more processors comprises a first circuit, configured to obtain an address via a network communicatively coupled to the network device;
the one or more processors further comprises a second circuit, configured to determine a length of a valid address of the address, wherein the valid address of the address is a $1^{st}$ bit, whose bit value is 1, of the address to a last bit of the address; and
the storage medium is configured to store a target table; wherein
the second circuit is further configured to: add, when the length of the valid address of the address is less than a table width of the target table, S number of zeros before the valid address of the address to obtain an adjusted address; and process the adjusted address based on the adjusted address and the target table, wherein S is a difference between the table width of the target table and the length of the valid address of the address, the target table comprises at least one entry, each of the at least one entry comprises a destination address, and the table width of the target table is a total quantity of bits occupied by one destination address stored in the target table.

10. The network device according to claim 9, wherein the storage medium is further configured to store a plurality of tables, and the plurality of tables comprise the target table; and
the second circuit is further configured to determine the target table before obtaining the adjusted address by adding the S number of zeros before the valid address of the address, wherein the target table is a table with a smallest table width among the tables whose table widths are greater than or equal to the length of the valid address of the address.

11. The network device according to claim 9, wherein the second circuit is configured to determine the destination address corresponding to the adjusted address in the target table.

12. The network device according to claim 9, wherein the second circuit is configured to create the at least one entry in the target table, wherein a destination address in the at least one entry is the adjusted address.

13. The network device according to claim 9, wherein the first circuit is configured to receive address indication information sent by a second network device, and determine the address based on the address indication information comprising a prefix field and a length field, wherein the address indication information is used to indicate values of the $1^{st}$ bit to the $N^{th}$ bit of the address and a first length M, both N and M are positive integers greater than or equal to 1, the values of the $1^{st}$ bit to the $N^{th}$ bit of the address are the values of the $1^{st}$ bit to the $N^{th}$ bit of the address that are indicated by the address indication information, and values of an $(N+1)^{th}$ bit to an $(N+M)^{th}$ bit of the address are preset values.

14. The network device according to claim 13, wherein the address indication information is further used to indicate a second length N, and the second circuit is configured to: determine, based on the second length N, that the N bits of the address indication information are respectively used to indicate the values of the $1^{st}$ bit to the $N^{th}$ bit of the address; determine that the values of the $1^{st}$ bit to the $N^{th}$ bit of the address are respectively the values of the N bits; and determine that the values of the $(N+1)^{th}$ bit to the $(N+M)^{th}$ bit of the address are the preset values.

15. The network device according to claim 14, wherein the prefix field comprises the values of the $1^{st}$ bit to the $N^{th}$ bit of the address, and the length field is used to indicate the first length M and the second length N.

16. The network device according to claim 15, wherein the length field comprises a first subfield and a second subfield, wherein the first subfield comprises the first length M, and the second subfield comprises the second length N;

the first subfield comprises the first length M, and the second subfield comprises a total length L of the address, wherein L is a sum of N and M; or the first subfield comprises the second length N, and the second subfield comprises the total length L of the address.

* * * * *